(12) United States Patent
Pollack et al.

(10) Patent No.: US 8,120,195 B2
(45) Date of Patent: Feb. 21, 2012

(54) WAVE ENERGY CONVERTER

(75) Inventors: Jack Pollack, Camarillo, CA (US);
Philippe F. Jean, Nice (FR)

(73) Assignee: Single Buoy Moorings, Inc., Marly (CH)

( * ) Notice: Subject to any disclaimer, the term of this patent is extended or adjusted under 35 U.S.C. 154(b) by 365 days.

(21) Appl. No.: 12/503,585

(22) Filed: Jul. 15, 2009

(65) Prior Publication Data

US 2010/0019498 A1    Jan. 28, 2010

Related U.S. Application Data

(60) Provisional application No. 61/135,729, filed on Jul. 23, 2008, provisional application No. 61/191,162, filed on Sep. 5, 2008.

(51) Int. Cl.
*F03B 13/12* (2006.01)
(52) U.S. Cl. .......................................................... 290/53
(58) Field of Classification Search .................... 290/53; 310/311
See application file for complete search history.

(56) References Cited

U.S. PATENT DOCUMENTS

| | | | | |
|---|---|---|---|---|
| 3,816,774 A * | 6/1974 | Ohnuki et al. ................ | 310/332 |
| 4,056,742 A * | 11/1977 | Tibbetts ........................ | 310/357 |
| 4,145,882 A * | 3/1979 | Thorsheim ..................... | 60/325 |
| 6,229,225 B1 | 5/2001 | Carroll | |
| 6,424,079 B1 * | 7/2002 | Carroll .......................... | 310/339 |
| 6,583,533 B2 | 6/2003 | Pelrine et al. | |
| 6,812,624 B1 | 11/2004 | Pei et al. | |
| 7,362,032 B2 * | 4/2008 | Pelrine et al. ................. | 310/309 |
| 7,538,445 B2 * | 5/2009 | Kornbluh et al. .............. | 290/53 |
| 7,557,456 B2 * | 7/2009 | Kornbluh et al. .............. | 290/42 |
| 7,696,634 B2 * | 4/2010 | Filardo ........................... | 290/54 |
| 7,863,768 B2 * | 1/2011 | Filardo ........................... | 290/54 |
| 7,898,152 B2 * | 3/2011 | Stocker et al. ................. | 310/328 |
| 7,980,071 B2 * | 7/2011 | Farley et al. ................... | 60/398 |
| 2001/0029401 A1 | 10/2001 | Ishida et al. | |
| 2008/0016860 A1* | 1/2008 | Kornbluh et al. .............. | 60/398 |
| 2010/0314871 A1* | 12/2010 | Jean et al. ...................... | 290/42 |
| 2011/0006532 A1* | 1/2011 | Grey et al. ..................... | 290/53 |

FOREIGN PATENT DOCUMENTS

| | | | |
|---|---|---|---|
| DE | 4339307 A1 * | 5/1995 | |
| GB | 2081387 A * | 2/1982 | |
| WO | WO 8400583 A * | 2/1984 | |
| WO | WO 2007/088325 A1 | 8/2007 | |
| WO | WO 2008/052559 A2 | 5/2008 | |

* cited by examiner

*Primary Examiner* — Joseph Waks
(74) *Attorney, Agent, or Firm* — Leon D. Rosen

(57) ABSTRACT

Systems are described for obtaining energy, especially electrical energy, from sea waves. An elongated elastic tube device (12) floats at the sea surface (20) (or at a shallow depth under it) and extends at least partially parallel to the direction of wave propagation (D). The tube bends as a wave passes by and such tube bending stretches and relaxes SSM (synthetic stretchable material) (44, 60, 62) which generates electricity in electrodes (46, 48) when its amount of stretching changes. Electricity from power takeoffs in the tube are electronically added.

7 Claims, 5 Drawing Sheets

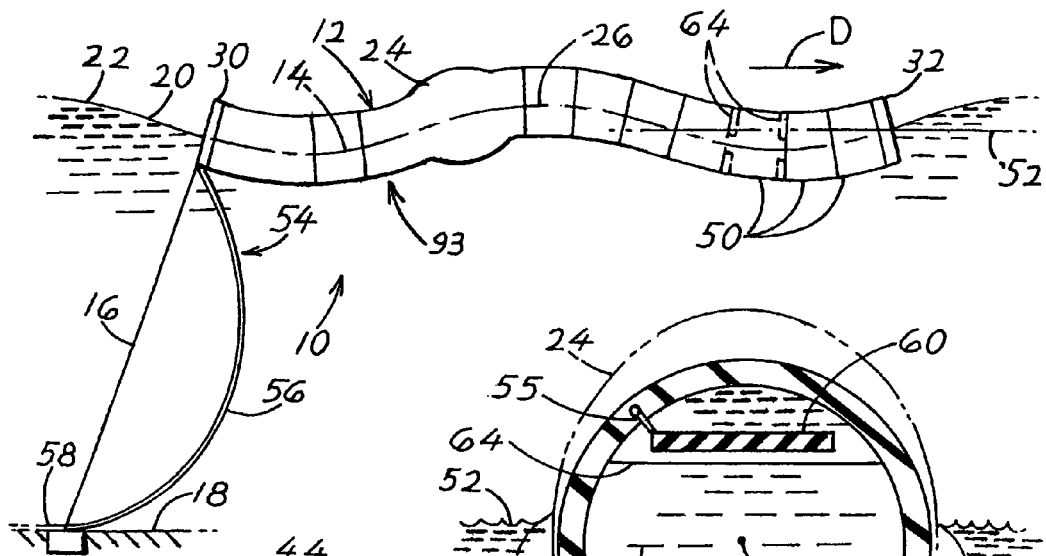
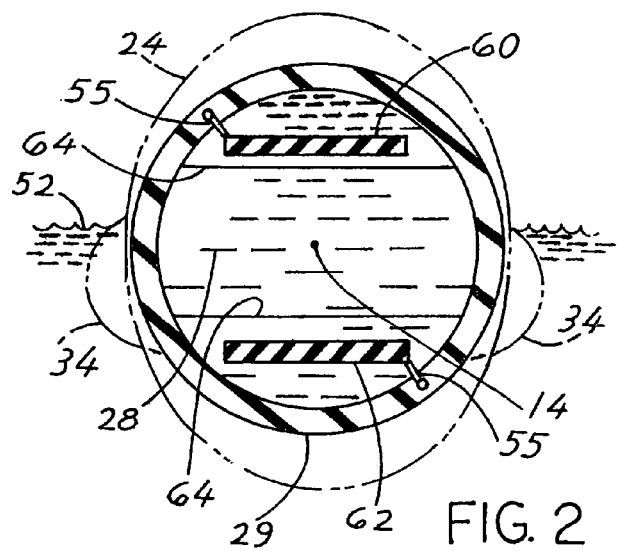
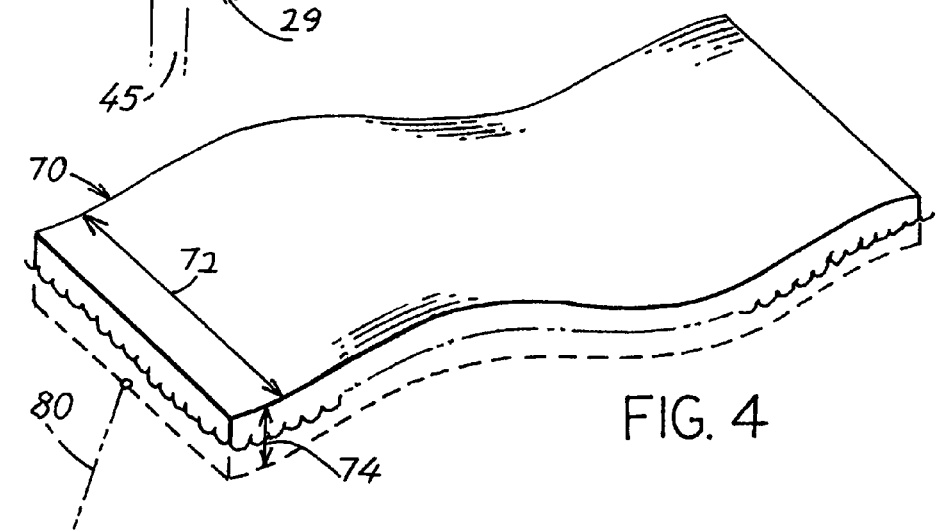

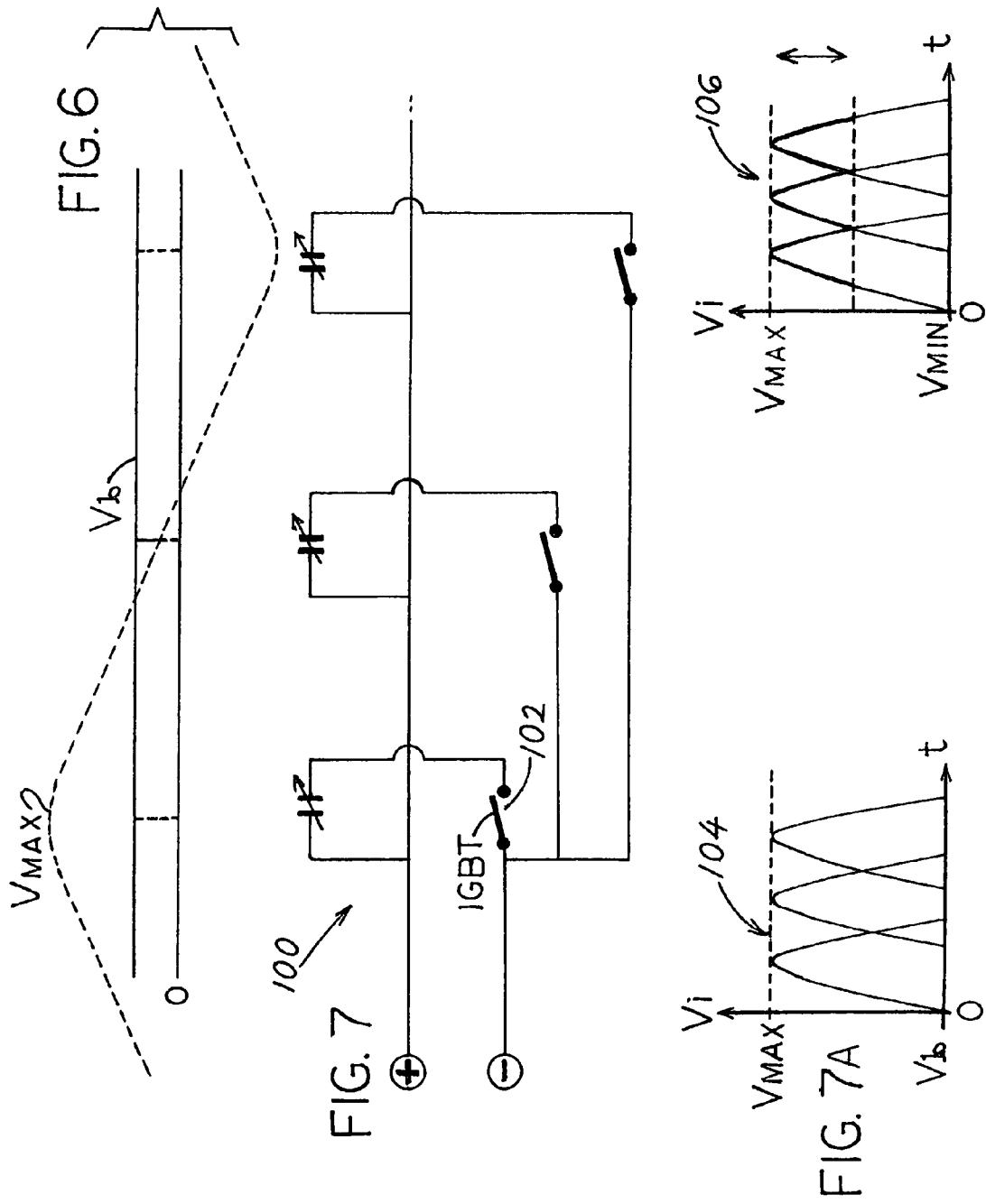

WAVE ENERGY CONVERTER

CROSS-REFERENCE

Applicant claims priority from U.S. provisional patent application Ser. No. 61/135,729 filed 23 Jul. 2008 and U.S. provisional patent application Ser. No. 61/191,162 filed 5 Sep. 2008.

BACKGROUND OF THE INVENTION

Sea wave energy is concentrated at the sea surface, from which it decays exponentially with depth. For deepwater waves, the decay in energy is such that at a depth equal to half the wavelength (the bottom of the wave energy zone) the remaining wave energy is no more than 5% of energy at the surface. Systems are being developed for extracting energy from sea waves, especially in the form of electricity.

There have been recent developments of SSM (synthetic stretchable material) such as EAP (electro active polymers, e.g. PVDF or polyvinyl chloride, electrets, etc.) which generates electricity when stretched or when the amount of stretching changes. Such SSM material is described in U.S. Pat. No. 6,768,246 by Pelrine and U.S. Pat. No. 6,812,624 by Pei, and in US patent publication 200110029401 by Ishido. The generation of electrical energy from sea waves using a simple and efficient system, would be of value.

SUMMARY OF THE INVENTION

In accordance with one embodiment of the invention, systems are provided for producing electrical energy from sea waves, using SSM (synthetic stretchable material) in an efficient manner. In one system, a bendable tube, especially one that is of elastomeric material, lies at the sea surface, wherein the tube floats at the sea surface. The tube is elongated and extends at least partially parallel to the direction of wave propagation. The waves produce a bulge in the elastic tube, with the bulge propagating along the length of the tube. Bands of SSM material extend around the centerline of the tube and are stretched and relaxed as the bulge passes by the bands, to generate electricity in electrodes lying at opposite faces of the tube.

The waves also bend the tube. Several SSM power take off systems (PTOs) for converting waves into mechanical and/or electrical energy are spaced along the length of the tube. Sheets of SSM material extend parallel to the centerline of the tube between PTOs, with the SSM sheets lying at the top and bottom of the tube. Bending of the tube to follow the curves of the waves, repeatedly increase and decrease stretching of the SSM sheets and thereby cause the SSM sheets to generate electricity in the electrodes.

A multiplicity of tubes with SSM material lie in a wave energy-extraction farm. The tubes are connected together by short electrical cables and the tubes are moored to the sea bed. The outputs of the multiple tubes are delivered to an electronic circuit that produces power with a voltage that varies only moderately.

In another system, elastic tubes are moored to lie at the level of sea wave troughs to lie under the sea waves most of the time. The increased water pressure under the crest of a wave, compresses a corresponding location of the tube, while leaving uncompressed those tube locations that lie under the trough of the wave. The variation of tube cross section, is used to stretch and relax sheets of SSM material.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of a wave power generating system of the present invention, shown lying in a wave.

FIG. 2 is a sectional view of the tube of FIG. 1.

FIG. 3 is a more detailed view of a portion of the tube of FIG. 2.

FIG. 4 is an isometric view of a tube of another cross-sectional shape for use in the system of FIG. 1.

FIG. 6 is a graph showing the output from one tube of the kind shown in FIG. 1.

FIG. 7 is a simplified schematic diagram of a switching circuit.

FIG. 7A is a graph showing the output of different power takeoffs of the tube of FIG. 1.

FIG. 7B is a graph showing the added outputs of FIG. 7A.

DESCRIPTION OF THE PREFERRED EMBODIMENTS

The height of ocean waves varies, with a common calm condition resulting in a wave height of under one meter and a wave period of under 7 seconds. A wave height of 1 to 4 meters and wave period of 10 to 15 seconds is a common sea condition. A wave height greater than 4 meters and wave period of more than 18 seconds occurs in a large storm, such as one that occurs once every 10 years. The average sea height is halfway between the crest and trough of waves.

Figure 11:
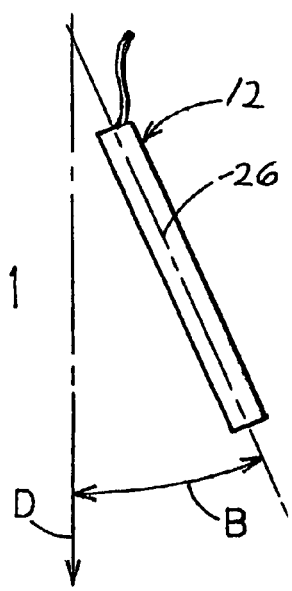
FIG. 11 is a plan view of a system showing directions of a tube axis with respect to wave direction.

FIG. 11 shows the direction D of waves and the direction of an elongated tube 12 and its axis 26. The angle B between the tube axis and the wave propagation direction D is preferably minimal (preferably B is no more than 45°), but may be as great as 80° (in opposite directions).

FIG. 1 shows a system 10 for generating electricity from sea waves which includes a converter 93 comprising an elongated tube device 12 that has elastomeric tube walls and a primarily horizontal centerline 14. The tube device is moored by a mooring line 16 that extends to the sea floor 18, and that allows the tube device to extend at least partially parallel to the direction D of sea wave movement and to float at the sea surface 20. As a wave 22 passes across the length of the tube device, the tube device develops a bulge 24 that tends to follow wave movement. When the crest (26) of a wave passes over a location in the tube, the crest compresses that tube location. As a result, water and air travel along the inside of the tube ahead of the crest and produce a traveling bulge in the tube. FIG. 2 shows that the tube is filled with water 28, the tube has opposite ends, and the tube has walls 29 that are elastomeric (Young's modulus of elasticity under 50,000 psi). The tube device is constructed to float at the sea surface, as by air filled floats 34. The opposite ends 30, 32 of the tube device may be open or closed. The bulge 24 expands the tube cross section by more than 10% but generally less than 50%. The tube device walls have a structure such as shown in FIG. 3 which shows a tube middle layer 44 of SSM (synthetic stretchable material) material that generates electricity when stretched or relaxed from a stretched state while a voltage is applied. A pair of electrodes 46, 48 lie on opposite faces of the middle layer. Outer and inner dielectric layers 40, 42 lie on opposite faces of the electrodes. Applicant prefers to use EAP (electro active polymers) for the SSM material. Electrical power generated from SSM material is delivered through electric conductors 55 to a power cable 54 that has a portion 56 that extends to the sea floor and another portion 58 that extends along the sea floor to a power station.

Instead of using only one layer of SSM material, applicant can use a plurality of layers 44, 45 (with a pair of electrodes at opposite faces of each SSM layer). The plurality of layers can consist of a long layer rolled into a spiral.

When the bulge 24 passes a location along the tube, the SSM layer 44 is stretched and then relaxed, and it generates an electrical current on its electrodes. Thus, each time a wave passes along the length of the tube and generates a traveling bulge along the tube centerline, the tube device generates a current.

When a wave passes along the length of the tube device 12, sections 50 of the tube that are spaced along the length of the tube, move up and down to follow the sinusoidal curvature of the top of the wave. The tube device or tube floats at the sea surface 20 with the top of the tube lying above the sea surface. In a quiescent sea the sea surface level would be at 52 and the tube would be straight and horizontal, with the top of the tube lying above the sea surface. In a sea wave, sections of the tube that lie above the wave trough drop down in the water under their own weight. Conversely, sections of the tube lying below the wave crest move up in the water because of their buoyancy that tends to locate the top of the tube section above the sea surface. All of this causes the tube to follow the wave curvature.

FIG. 2 shows sheets 60, 62 of SSM material that extend between PTOs (power takeoff systems) at 64 (FIG. 1) that are spaced along the tube. Pairs of PTOs 64 support opposite ends of a SSM sheet and receive electricity generated by a sheet. The ends of the sheets lie at positions spaced from the tube centerline 14. When the tube bends to follow the curvature of a sea wave, one of the sheets 60, 62 is stretched and the other sheet relaxes as when it experiences reduced stretching if it was prestretched. The sheets therefore generate current. The sheets 60, 62 can be used in addition (or instead on the layer 44 of SSM material that is wrapped around the tube centerline and generates current when a bulge passes along the tube.

A tube 12 that applicant designed had a diameter of one meter and a length of 20 meters.

FIG. 4 shows a tube 70 that is somewhat in the shape of a mattress, with a horizontal width 72 that is a plurality of times its height 74. Where the direction of waves is primarily constant, the tube can be moored by a plurality of lines, and where the direction of waves changes a single line 80 can moor the tube. The tube bends so all portions of the tube extend a small distance above a wave passing across the tube.

Figure 5:
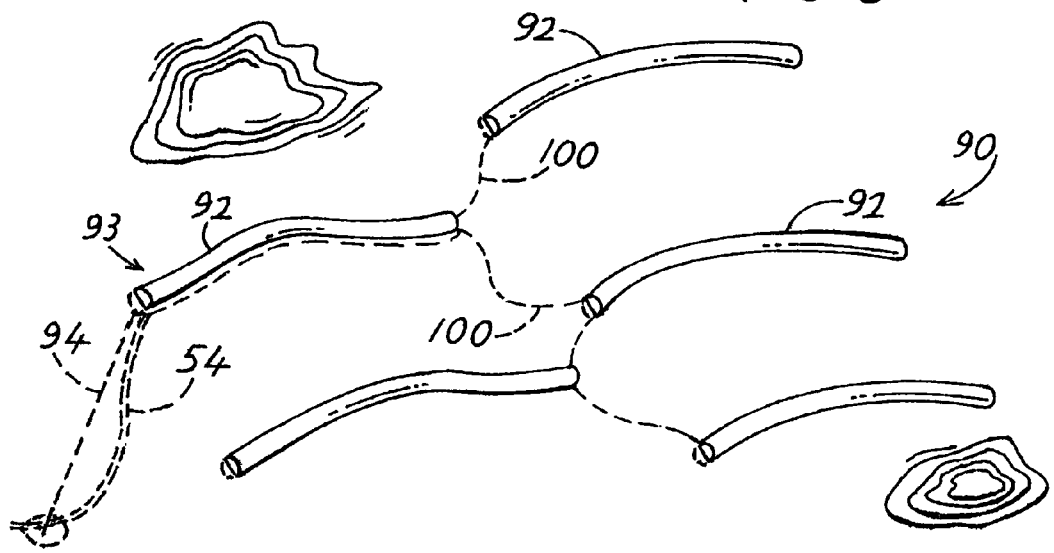
FIG. 5 is an isometric view of a tube farm consisting of tubes with electrical outputs that are interconnected.

FIG. 5 illustrates a portion of a tube farm 90 which includes a plurality of energy converters, or converter devices 93 that each includes a tube 92 anchored to the sea floor as by a separate line 94. The converters all lie in the same vicinity (within 100 meters, and preferably 50 meters, of an adjacent tube). It would be possible to provide a separate power cable 54 to carry away electricity generated by SSM material in each tube, but that would raise the cost of the installation. Instead, applicant provides a plurality of short coupling cables 100 that each extends between WEC (wave energy converter) tubes and that generally do not extend along the seafloor. Only one of the multiple tubes is connected to a power station by a cable 54 that extends along the sea floor to that station.

In the present invention, one WEC (wave energy converter) is fitted with several PTOs (64, FIG. 1) at distinct locations along the length (or width) of the body. The arrangement of the synthetic stretchable material PTOs (power takeoffs) is such that they are activated one after the other by the incoming sea wave thereby creating a multiphase electrical signal. Under the action of the sea wave, the first synthetic stretchable material PTO is stretched. When it has reached its maximum stretch, it is charged at a bias voltage (Vb) shown in FIG. 6. After the sea wave has moved further down to activate the next PTO, the first PTO relaxes and the voltage is then raised to the maximum voltage (Vmax) by conversion of elastic to electric potential energy. The same mechanism is reproduced for each PTO in sequence. When the charge is removed from a PTO, the voltage drops from Vmax to zero in a known discharge duration (related to the RC constant of the circuit). By having enough PTOs, it is possible to switch between successive PTOs faster than the discharge duration. Then, the main output voltage will fluctuate only within very tight and controllable bounds around Vmax.

In one embodiment, the PTOs are regularly spaced in the direction of propagation of the wave (by a fraction of the wave length of interest) along the length of a deformable WEC (wave energy converter). In this case, the switching sequence is incremental starting from the first PTO located on the up-wave side of the WEC to the last PTO located on the down-wave side. As a result an "electrical wave" of voltage is propagating along the WEC length at the same speed as the real sea wave. The same principle can be applied even if the synthetic stretchable material PTOs are actuated randomly by an irregular wave sea state coming from any direction. The power electronics are used to optimize the sequence of charging and discharging of each PTO in order to maintain the output voltage almost constant.

It is also possible to discharge on activated PTO into another un-activated one in order to progressively pump up the voltage. This process can be repeated until the voltage is sufficiently close to Vmax. This allows the WEC system to generate voltages close to Vmax even when the sea waves are smaller. FIG. 7 is a simplified schematic diagram of a switching circuit that includes electronically controlled switches 102 such as IGBT (insulated gate bipolar transistor). FIG. 7A shows a graph 104 representing the outputs of different PTOs at different times, while graph 106 of FIG. 7B represents the summed graph 104 when their outputs above a given level are added. When a charge is removed from a PTO the voltage drops from Vmax to Vmin during a known discharge duration. By having enough PTOs the output voltage fluctuates within limits as shown in graph 106.

Thus, the invention provides systems for generating electricity by absorbing energy using SSM (synthetic stretchable material) that produces energy as it stretches. The present invention provides systems for generating a continuous and largely constant output voltage close to the maximum voltage generated by the system even when the sea state is calm.

Figure 8:
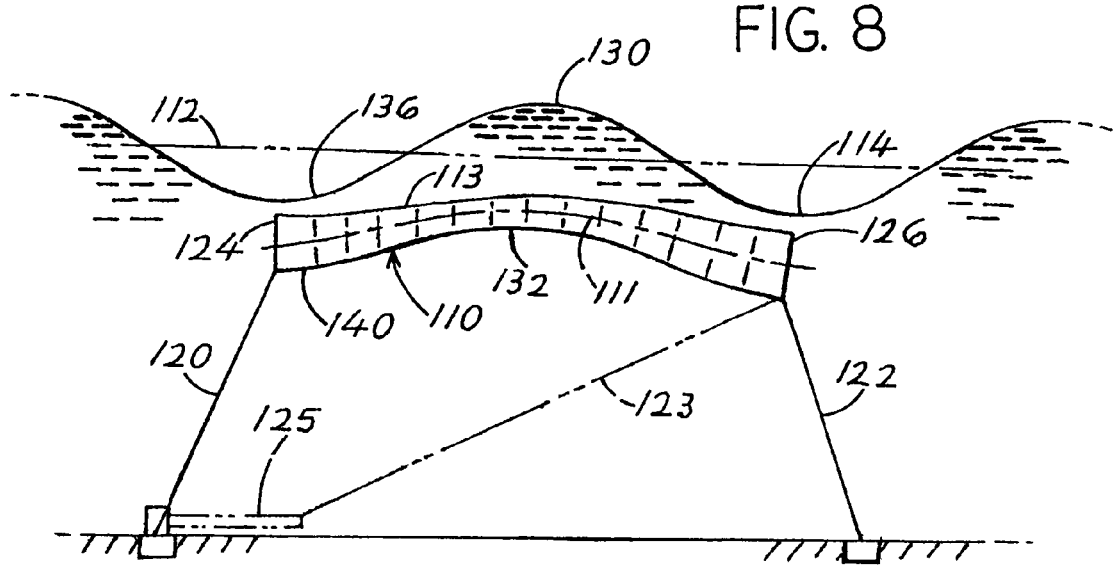
FIG. 8 is a side view of a wave power generating system of another embodiment of the invention, wherein the tube lies substantially completely submerged in the sea.
Figure 9:
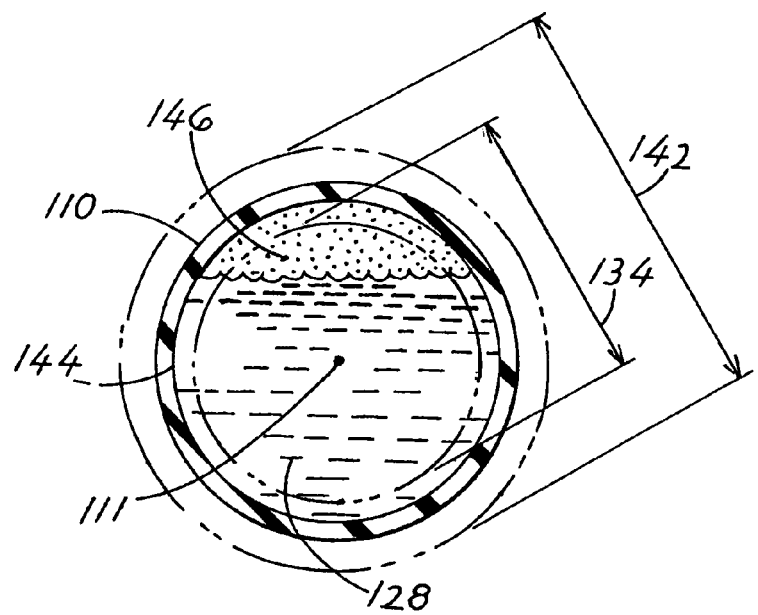
FIG. 9 is a sectional view of the tube of FIG. 8.

FIGS. 8 and 9 illustrate a tube 110 with a centerline 111 which lies below the quiescent sea level 112, and a top 113 that preferably lies at about the level of wave troughs 114 of the most common useful wave heights in the region of the sea where the system lies. The tube is positively buoyant and is maintained at its height above the sea floor by a pair of mooring lines 120, 122. Applicant also shows a mooring line 123 attached to a swivel 125 that allows the tube to change its orientation to always extend parallel to sea currents. The opposite ends 124, 126 of the tube are closed and the tube is largely filled with water 128, although it can be filled at least partially with a fluid of slightly lower specific gravity such as an oil. When a wave crest 130 lies over a section 132 of the tube, the increased outside water pressure at that tube section results in that tube section compressing in diameter to diameter 134. When a wave trough 136 lies over a section 140 of the tube, that section expands in diameter to diameter 142. Applicant can fill the tube with water and a limited amount of pressured air 146, as shown in FIG. 9. The pressured air not only makes the tube positively buoyant, but increases the initial diameter of the tube by prestressing the walls of the tube and prestressing SSM material 144 that lies against the tube walls. The tube has the construction shown in FIG. 3. Thus, when a wave crest 130 moves to a position over a tube section and that tube section contracts in diameter, SSM material 144 in the tube undergoes a decrease in tension.

Figure 10:
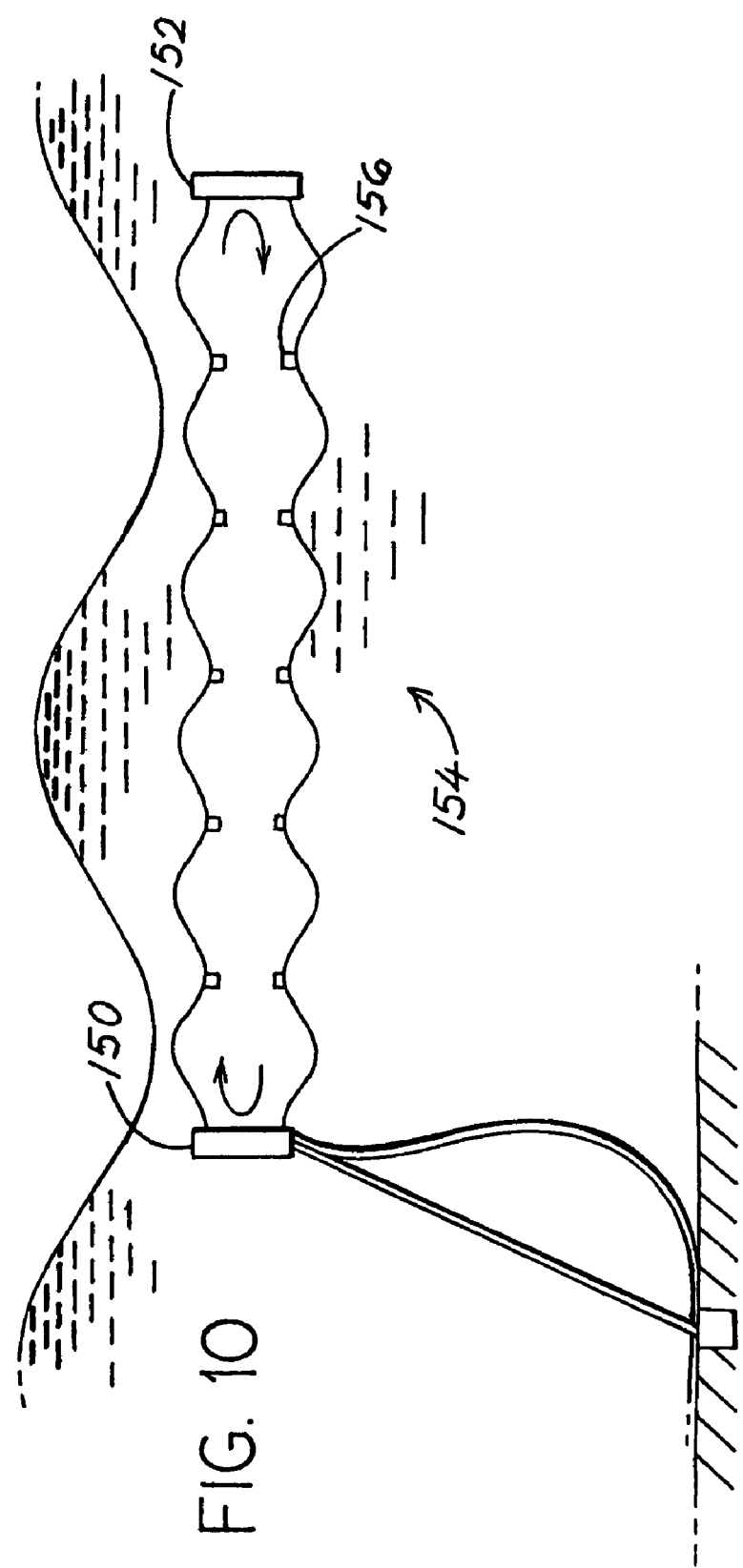
FIG. 10 is a side elevation view of an elastomeric tube with closed ends.

In embodiments where the ends 150, 152 (FIG. 10) of the tube 154 are closed, the tube will not function in a propagating wave mode (as it will when the tube ends are opened) but in a standing wave mode. This behavior is particularly well suited to a tube with distributed synthetic stretchable material PTOs 156 along its length. This is only possible thanks to the large strainability of the SSM material chosen such as EAP material. In a standing wave mode, it is possible to excite resonance modes and hence achieve very high energy transfer from waves to the tube (spring mass system). In this embodiment waves are bouncing back on the WEC extremities, going back and forth the length of the tube hence creating standing waves.

Thus, applicant provides simple and reliable systems for generating electricity from sea waves by the use of a buoyant tube with elastomeric tube walls, that is moored to lie at the sea surface, so the tube undergoes changes as sea waves pass through or over it. One tube floats with the top of the tube lying above the quiescent sea level so the tube bends to follow the shape of a wave passing along the length of the tube. The tube also experiences a bulge that moves along the length of the tube. Another tube lies below the sea surface a majority of the time, and undergoes a change in diameter as a wave passes along the length of the tube. For these tubes, SSM material, which generates electricity when it undergoes a change in stretching, is coupled to the tube walls and is used to generate electricity.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A wave energy converter (93) for generating electricity from sea waves that move along a wave propagation direction in a sea, where the sea has a sea surface (20), a sea floor (18) and a wave energy zone that lies within a half wavelength of said sea waves below the sea surface, comprising:
   an elongated tube (12) that extends along a tube centerline (14) and that is bendable to enable different sections (50) of said tube that are spaced along said tube centerline to deviate in different vertical directions and in different amounts from a straight line, said tube having primarily horizontally spaced opposite ends (30, 32) and said tube floats in said sea;
   a device that includes a sheet (44) of SSM (synthetic stretchable material) material (44, 60, 62) wrapped into a continuous tubular shape and forming walls of said tube and that also includes a pair of electrodes (44, 46) lying at opposite faces of said sheet, said device generating electricity on said electrodes when said sheet is stretched in different amounts, with bending of the tube producing stretching and relaxation of stretching of said device, and including electric conductors (55) coupled to said electrodes to carry away electricity.

2. The converter described in claim 1 wherein:
   said tube has primarily circular cross-sections, and said sheet of SSM material extends in a plurality of circles lying within one another, within said tube.

3. The converter described in claim 1 including:
   a plurality of power takeoff systems spaced along the length of said tube, each power takeoff system including one of said electric conductors;
   said quantity of SSM material includes a plurality of quantities of SSM material that generates electricity when stretched in different amounts, spaced along the length of said tube with each quantity of SSM material connected to at least one of said power takeoff systems; and including
   means connected to said power takeoff systems for adding the outputs of said takeoffs.

4. The converter described in claim 1 including:
   a plurality of sequential placed EAP (electro active polymer) power takeoff systems that are so connected that the output voltage of the wave energy converter is continuously close to the maximum voltage raise of each individual power takeoff system.

5. The connector described in claim 1 including:
   at least one mooring line (16) that has a lower end connected to the sea floor and an upper end that is connected to said tube;
   said mooring line and said tube are constructed to hold said tube so it lies only partially submerged in the sea, so that in a quiescent sea an upper end of said tube which lies above said centerline lies above the sea surface.

6. The converter described in claim 1 wherein:
   said tube device (70) is of a mattress shape, with a width (72) in a horizontal direction that is perpendicular to said length, and a height (74) in a vertical direction;
   said width (72) being a plurality of times greater than said height (74).

7. A wave energy converter for generating electricity from sea waves that move along a wave propagation direction (D) in a sea, where the sea has a sea surface and a sea floor, comprising:
   an elongated tube device (110) that includes a tube extends along a tube centerline and that is bendable to deviate in different vertical directions and in different amounts from a straight line, said tube having primarily horizontally spaced opposite ends (124, 126);
   said tube device includes a sheet of SSM (synthetic stretchable material) material forming a tube and a pair of electrodes (46, 48) at opposite faces of said sheet, said tube device generating electricity in said electrodes when the tube is stretched in different amounts, and including at least one electric conductor coupled to said electrodes;
   said tube is positively buoyant, and including a pair of mooring lines (120, 122, 123) extending from underwater locations in largely upward directions to said tube opposite ends and holding said tube below a quiescent sea surface level (112).

\* \* \* \* \*